(12) United States Patent
Miyake

(10) Patent No.: US 8,373,901 B2
(45) Date of Patent: Feb. 12, 2013

(54) IMAGE-PROCESSING APPARATUS AND IMAGE-PROCESSING METHOD

(75) Inventor: Nobutaka Miyake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1316 days.

(21) Appl. No.: 12/116,392

(22) Filed: May 7, 2008

(65) Prior Publication Data

US 2008/0278738 A1 Nov. 13, 2008

(30) Foreign Application Priority Data

May 8, 2007 (JP) ................. 2007-123411

(51) Int. Cl.
*H04N 1/60* (2006.01)
*G06K 1/00* (2006.01)

(52) U.S. Cl. .................... 358/3.03; 358/1.9; 358/471

(58) Field of Classification Search .............. 358/1.9, 358/3.03, 1.14, 3.28, 1.2, 1.18; 347/3; 382/100, 382/284, 298, 299
See application file for complete search history.

(56) References Cited

U.S. PATENT DOCUMENTS

| | | | | |
|---|---|---|---|---|
| 4,392,220 A * | 7/1983 | Hirosaki et al. | ............. | 370/479 |
| 5,748,774 A * | 5/1998 | Murata | ......................... | 382/181 |
| 6,252,991 B1 * | 6/2001 | Uchio et al. | .................. | 382/236 |
| 6,519,055 B1 * | 2/2003 | Curry et al. | .................... | 358/2.1 |
| 6,954,542 B2 * | 10/2005 | Miyake et al. | ................ | 382/100 |
| 2002/0165451 A1 * | 11/2002 | Phelps et al. | ................... | 600/437 |
| 2004/0212846 A1 * | 10/2004 | Baunach et al. | .............. | 358/471 |
| 2005/0057645 A1 * | 3/2005 | Sung et al. | ....................... | 348/43 |

FOREIGN PATENT DOCUMENTS

| | | |
|---|---|---|
| JP | 63-214067 A | 9/1988 |
| JP | 01-292965 A | 11/1989 |
| JP | 2001-148778 A | 5/2001 |

* cited by examiner

*Primary Examiner* — King Poon
*Assistant Examiner* — Allen H Nguyen
(74) *Attorney, Agent, or Firm* — Canon USA Inc IP Division

(57) ABSTRACT

A large-capacity multiplexing system assuring image quality and robustness is provided. An image-processing apparatus multiplexing additional information on image information includes a first multiplexing unit that is configured to perform pseudo-halftone processing so that the image information is changed into a first quantization level of multi-level gradation and that is configured to multiplex first information of the additional information at the pseudo-halftone-processing time, and a second multiplexing unit that is configured to perform the pseudo-halftone processing so that the first quantization level subjected to the pseudo-halftone processing by the first multiplexing unit is changed into a second quantization level of gradation lower than the multi-level gradation and that is configured to multiplex second information of the additional information at the pseudo-halftone-processing time.

15 Claims, 12 Drawing Sheets

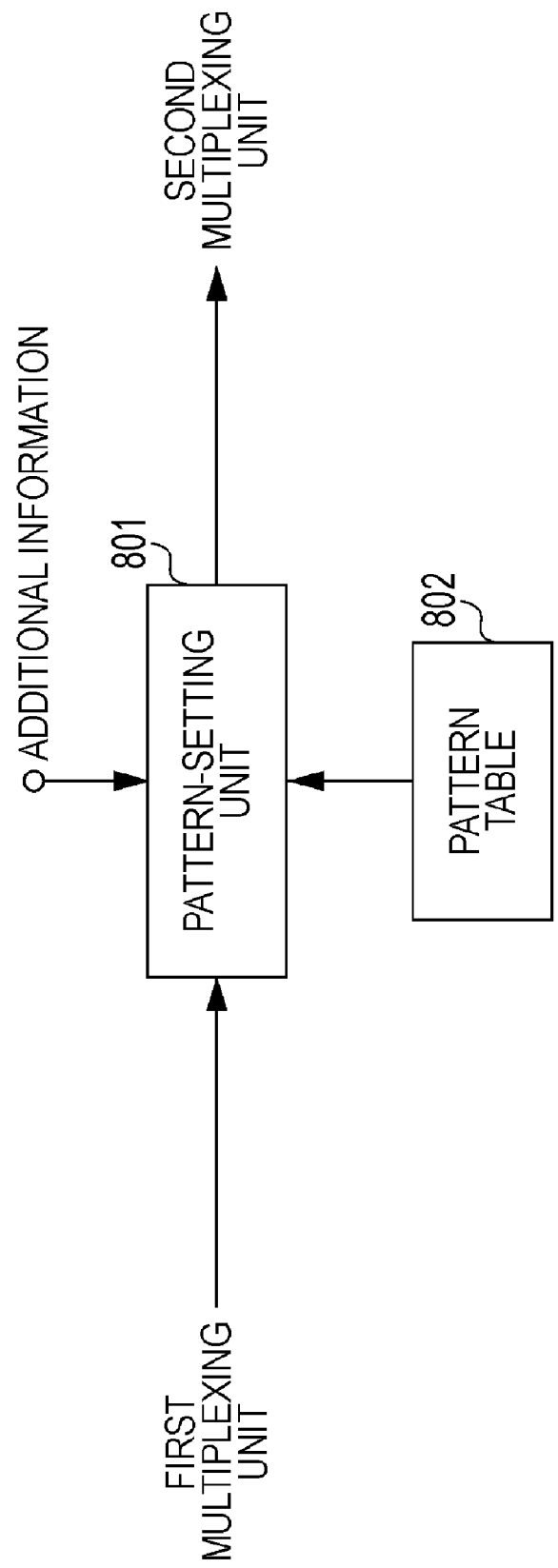

IMAGE-PROCESSING APPARATUS AND IMAGE-PROCESSING METHOD

BACKGROUND OF THE INVENTION

1. Field of the Invention

The present invention relates to an image-processing apparatus and an image-processing method.

2. Description of the Related Art

Hitherto, multiplexing systems wherein multiplexing of additional information is united with redundancy of pseudo-halftone processing have been proposed.

According to a multiplexing system disclosed in Japanese Patent Laid-Open No. 63-214067 (hereinafter referred to as "the first multiplexing system"), data is mixed with an image signal by selecting any one of dither matrices expressing the same gradation at the time where binarization is performed according to an organized dithering method. Further, according to a multiplexing system disclosed in Japanese Patent Laid-Open No. 01-292965 (hereinafter referred to as "the second multiplexing system"), a color dither-pattern method is used so that additional information is multiplexed based on an array used for the color dither-pattern method.

Further, multiplexing systems from which high robustness can be expected have been proposed. According to a multiplexing system disclosed in Japanese Patent Laid-Open No. 2001-148778 (hereinafter referred to as "the third multiplexing system"), a quantization threshold value used for an error-diffusion method is subjected to amplitude modulation and the periodicity of the modulation is changed into predetermined blocks based on code of additional information so that additional information is multiplexed on data on a printed image. Decoding of the multiplexed additional information is specified by relatively comparing orthogonal-transformation coefficients obtained for each of predetermined bands to each other based on the premise that power of a predetermined frequency band increases for each of predetermined blocks. Contrasted with the first and second multiplexing systems, the precision of decoding performed in the third multiplexing system does not significantly vary due to phase information indicating the precise positions of fine dots, distances between dots, etc. According to the third multiplexing system, the additional information is multiplexed in the plural bands corresponding to frequencies lower than quantization frequencies used for the error-diffusion method. Therefore, the third multiplexing system is resistant to some deflection of dots, the smear of ink droplets, etc., and high robustness can be expected.

According to the third multiplexing system, however, the band where the additional information is multiplexed is lower than that of the quantization frequencies. Therefore, visual deterioration of the quality of an image shown on paper becomes more conspicuous than in the case where the first and second multiplexing systems are used. According to the third multiplexing system, the image-quality deterioration can be reduced by decreasing the amount of code for multiplexing for each of predetermined blocks. In that case, however, the amount of information that can be multiplexed is limited.

As digital data becomes widely available, the desire to increase the amount of additional information that can be multiplexed on paper grows. However, no appropriate large-capacity multiplexing assuring image quality and robustness has been achieved through any of known multiplexing systems.

SUMMARY OF THE INVENTION

Accordingly, the present invention provides a large-capacity multiplexing system assuring image quality and robustness.

According to an aspect of the present invention, an image-processing apparatus multiplexing additional information on image information includes a first multiplexing unit that is configured to perform pseudo-halftone processing at a pseudo-halftone-processing time so that the image information is changed into a first quantization level of multi-level gradation and that is configured to multiplex first information of the additional information at the pseudo-halftone-processing time, and a second multiplexing unit that is configured to perform the pseudo-halftone processing so that the first quantization level subjected to the pseudo-halftone processing by the first multiplexing unit is changed into a second quantization level of gradation lower than the multi-level gradation and that is configured to multiplex second information of the additional information at the pseudo-halftone-processing time.

According to another aspect of the present invention, an image-processing method performed to multiplex additional information on image information includes performing pseudo-halftone processing at a pseudo-halftone-processing time so that the image information is changed into a first quantization level of multi-level gradation and first information of the additional information is multiplexed at the pseudo-halftone-processing time, and performing the pseudo-halftone processing so that the first quantization level subjected to the pseudo-halftone processing at the first multiplexing step is changed into a second quantization level of gradation lower than the multi-level gradation and where second information of the additional information is multiplexed at the pseudo-halftone-processing time.

Further functions and features of the present invention will become apparent from the following description of exemplary embodiments with reference to the attached drawings.

BRIEF DESCRIPTION OF THE DRAWINGS

FIG. 8 is a main-block diagram showing the second multiplexing unit.

DESCRIPTION OF THE EMBODIMENTS

First Embodiment

Hereinafter, exemplary embodiments of the present invention will be described with reference to the attached drawings. However, the present invention is not limited to the following exemplary embodiments.

Figure 1:
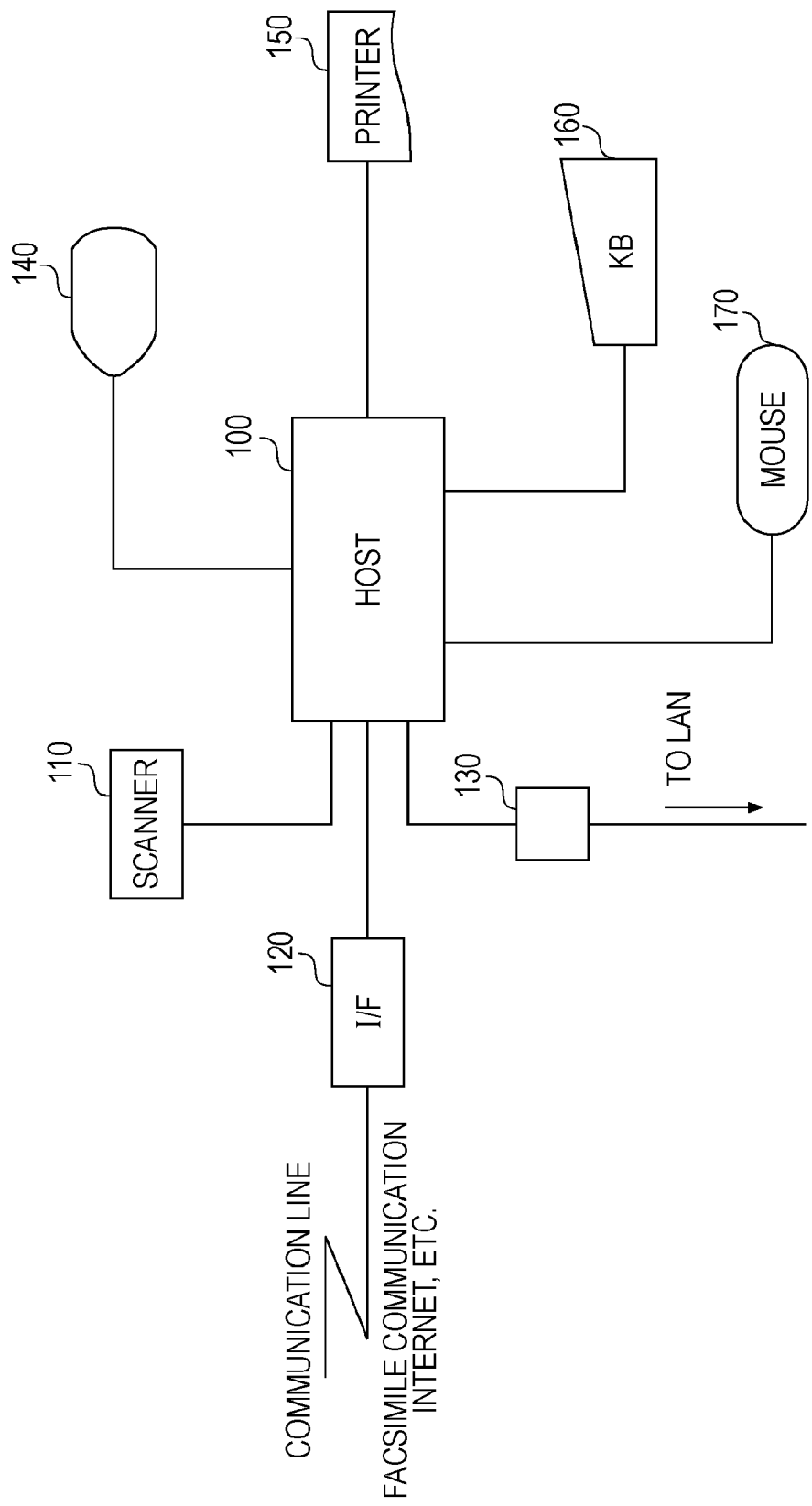
FIG. 1 is a block diagram showing an example configuration of an image-processing apparatus according to an embodiment of the present invention.

FIG. 1 is a block diagram showing an example configuration of an image-processing apparatus according to an embodiment of the present invention. As shown in FIG. 1, the image-processing apparatus includes a host computer (hereinafter referred to as a "host") 100 configured to process image information. Further, the image-processing apparatus includes a scanner 110 configured to read data shown on an image document and to generate image information, a communication interface (I/F) 120 configured to receive the image information via a communication line, and a local-area-network (LAN) I/F 130 configured to receive the image information via a LAN. Further, the image-processing apparatus is provided with a display 140 including a liquid-crystal display (LCD), a plasma-display panel (PDP), a field-emission display (FED), a cathode-ray tube (CRT), etc. configured to display image information, as an image. Further, the image-processing apparatus includes a printer 150 configured to output image information so that an image is produced on a recording medium such as a recording form, and a keyboard (KB) 160 and a mouse 170 that allow for performing various types of man-machine operations required to perform image processing.

The host 100 includes a central-processing unit (CPU) configured to perform image processing, communication-control processing, etc., a read-only memory (ROM) configured to store a control program or the like, and a random-access memory (RAM) that is configured to store image information and that is used as a work area necessary to perform the image processing. The host 100 further includes a hard disk storing a large amount of data, a magneto-optical disk, and an I/F used to establish connections with various types of peripheral devices.

Data transmitted to the communication I/F 120 may include facsimile data and/or digital-image information transmitted via the Internet.

Basically, the printer 150 includes a printer controller functioning as an interface between the printer 150 and the host 100, and a printer engine. The printer engine may include a printer engine operating under the inkjet system, a printer engine operating under the electrophotography system, or engines operating under other recording systems.

If the communication I/F 120 and/or the LAN I/F 130 is detached from the above-described image-processing apparatus, and the display 140, the keyboard 160, the mouse 170, etc. are grouped as an operation panel, for example, the image-processing apparatus can be used as a single copier. Further, if the LAN I/F 130 is detached from the image-processing apparatus, the display 140, the keyboard 160, the mouse 170, etc. are grouped as the operation panel, and the communication I/F 120 is used as an interface expressly meant for a facsimile, the image-processing apparatus can be used, as a single facsimile. Further, an image-processing system can be achieved by using a personal computer as the host and connecting each of the above-described units to the personal computer as peripheral devices.

Figure 2:
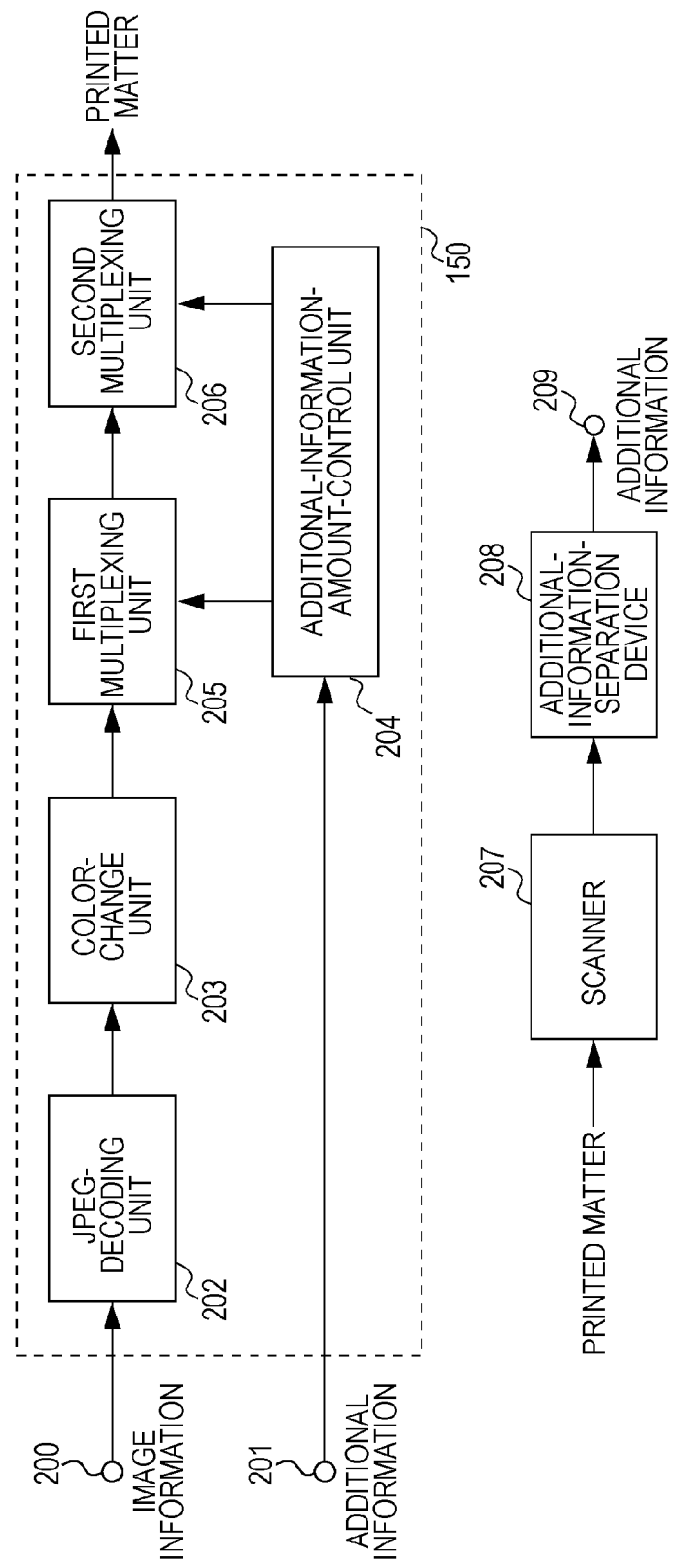
FIG. 2 is a block diagram indicating the image-processing apparatus.

FIG. 2 is a block diagram showing the configuration of the image-processing apparatus. In FIG. 2, blocks surrounded by a broken line indicate the printer 150.

Image information of multi-level gradation is transmitted from the host 100 to an input end 200. The above-described image information is, for example, a data sequence which is encoded in such a manner that the data sequence conforms to the format of a Joint-Photographic-Experts-Group (JPEG) image.

A JPEG-decoding unit 202 is configured to decode image information generated in the JPEG format so that the image information is changed into information about the brightness (determined to be Y) determined in pixels and information about color-difference components (determined to be Cr and Cb).

A color-change unit 203 is configured to perform color separation so that a brightness-color-difference component is separated into ink components of the printer 150. The color components Y, Cr, and Cb can be changed into ink components yellow (Y), magenta (M), cyan (C), and black (K) according to various known technologies using calculations, a Look Up Table (LUT), etc. Further, the color components Y, Cr, and Cb may not be directly changed into the ink components. Namely, the color components Y, Cr, and Cb may be changed into the ink components after being changed into components of red (R), green (G), and blue (B) colors.

Information different from the image information transmitted to the input end 200 is transmitted to an input end 201. The different information includes, for example, sound information, text-document information, various information relating to the image information transmitted to the input end 200, where the various information includes, for example, information about the copyright, the date and time of photo shooting, the location of photo shooting, the photographer, etc., and other image information.

An additional-information-amount-control unit 204 performs separation between code multiplexed at the first multiplexing unit 205 (the first multiplexing unit) and code multiplexed at the second multiplexing unit 206 (the second multiplexing unit) based on the amount of transmitted additional information. Each of the first multiplexing unit 205 and the second multiplexing unit 206 achieves pseudo-halftone processing and multiplexing of the additional information at the same time. That is to say, each of the first multiplexing unit 205 and the second multiplexing unit 206 performs the additional-information multiplexing at the pseudo-halftone-processing time.

Information shown on an output printed matter is read by a scanner 207. Then, an additional-information-separation device 208 separates additional information embedded in the information shown on the printed matter and outputs the separated additional information to an output end 209.

Figure 3:
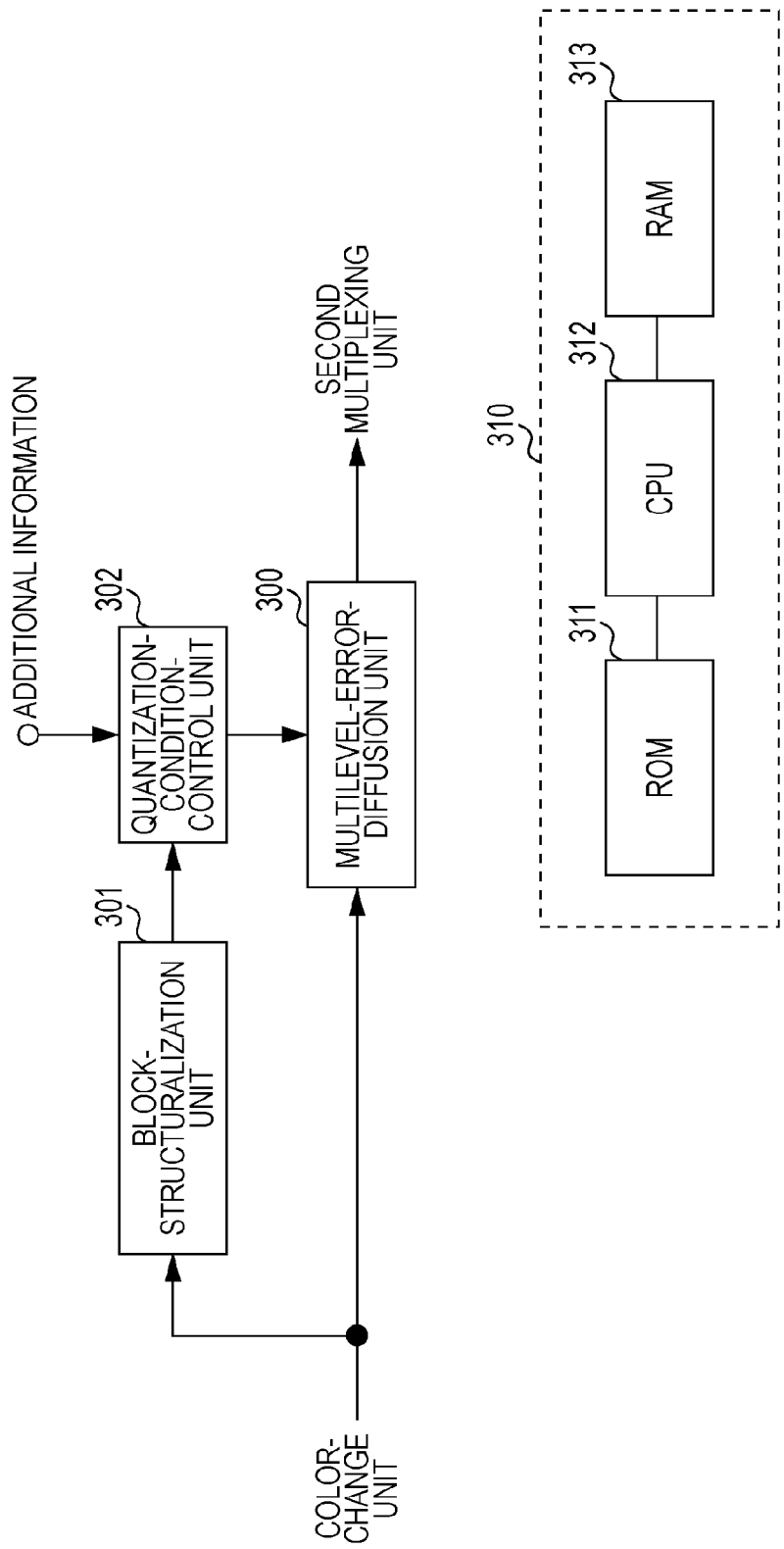
FIG. 3 is a block diagram indicating the first multiplexing unit.

FIG. 3 is a block diagram showing the configuration of the first multiplexing unit 205 shown in FIG. 2. A multilevel-error-diffusion unit 300 performs the pseudo-halftone processing for image information transmitted thereto by using an error-diffusion method so that the image information is transformed into a quantization level (the first quantization level) smaller than an input-gradation number so that gradation is areally expressed by using quantization values of pixels. Details on error-diffusion processing will be described later. A block-structuralization unit 301 divides image information transmitted thereto into predetermined regions or blocks. Each of the blocks may have a rectangular shape or other shapes. A quantization-condition-control unit 302 controls quantization conditions in the units of regions obtained through the block structuralization performed by the block-structuralization unit 301. The quantization-condition-control unit 302 controls the quantization conditions in blocks based on additional information transmitted through an input end 101.

A control unit 310 includes a CPU 311, a ROM 312, a RAM 313, etc. The CPU 311 controls operations and processing performed by each of the above-described components according to a control program stored in the ROM 312. The RAM 313 is used as a work area of the CPU 311.

Figure 4:
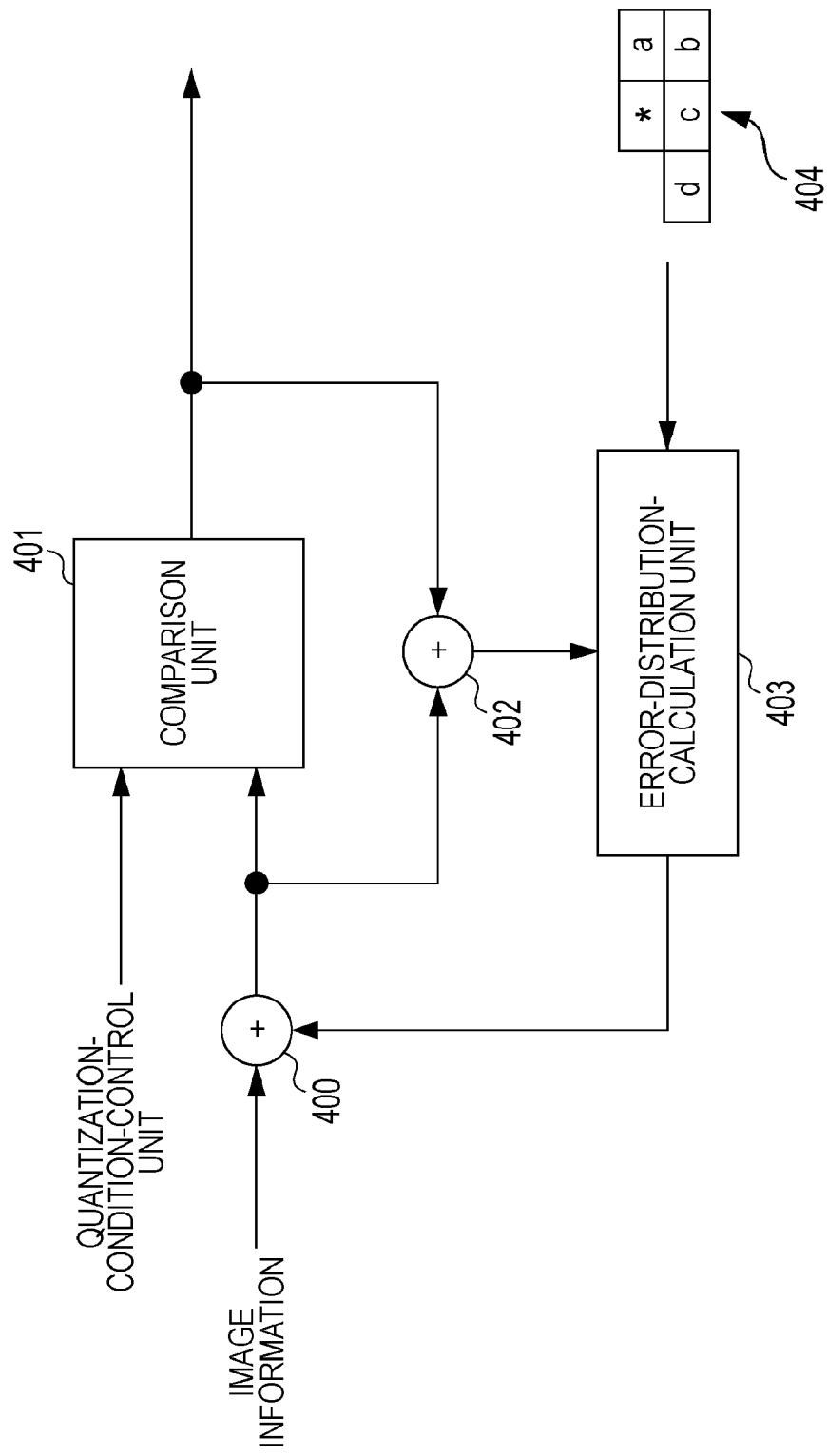
FIG. 4 is a block diagram indicating a multilevel-error-diffusion unit.

FIG. 4 is a block diagram showing the detailed configuration of the multilevel-error-diffusion unit 300.

Hereinafter, the error-diffusion processing will be described, for example, based on the premise that a binary quantization value is used. An adder 400 adds the value of a target pixel of image information transmitted thereto to a binarized value of a quantization error distributed over surrounding pixels. A comparison unit 401 compares a quantization-threshold value and a result of the error addition, where information about the quantization-threshold value is transmitted from the quantization-condition-control unit 302. If the value of the error-addition result is larger than a predetermined quantization-threshold value, the comparison unit 401 outputs data 1. Otherwise, the comparison unit 401 outputs data 0. For example, in the case where the gradation of pixels is expressed with 8-bit precision, the pixel gradation is usually expressed at from the maximum value 255 to the minimum value 0. If the assumption is made that a dot is printed on a sheet of paper by using ink, toner, etc. when the quantization value is 1, a subtractor 402 calculates the error between the quantization result and the above-described addition result, and distributes the values corresponding to the error over the surrounding pixels subjected to quantization performed in the future according to an error-distribution-calculation unit 403. The ratio of the error distribution is determined in the following manner. Namely, a distribution table 404 used to distribute an error which is experimentally determined based on the relative distance between the surrounding pixels and the target pixel is provided in advance. Then, the error is distributed based on a distribution ratio shown on the distribution table 404. Although the distribution table 404 shown in FIG. 4 is used to distribute an error over four surrounding pixels, the present invention is not limited to the above-described embodiment.

Although the quantization value is binary in the above-described embodiment, the essentials of the error-diffusion processing remain the same even though the quantization value is ternary. If the quantization value is ternary, three quantization values 0, 1, and 2 exist. Therefore, if the pixel gradation is expressed with 8-bit precision, the quantization representative values corresponding to the three quantization values become 0, 128, and 255. Further, two quantization threshold values 64 and 192 are determined in advance, where the quantization threshold value 64 is the value existing midway between the quantization representative values 0 and 128, and the quantization threshold value 192 is the value existing midway between the quantization representative values 128 and 255. When the target-pixel value to which the error values distributed over the surrounding pixels are added is compared to the quantization-threshold value, a desired quantization value is output.

Next, the entire operations including operations of the quantization-condition-control unit 302 will be described based on a flowchart of FIG. 5. Here, the quantization value is binary, for example.

Variable i is initialized at step S501. The variable i is used to count a vertical address. Variable j is initialized at step S502. The variable j is used to count a horizontal address. Then, a determination is made at step S503 based on the values of the addresses of the variables i and j. Namely, it is determined whether or not the coordinates of the variables i and j are in a region where multiplexing should be performed, where the coordinates indicate the current processing address.

Figure 6:
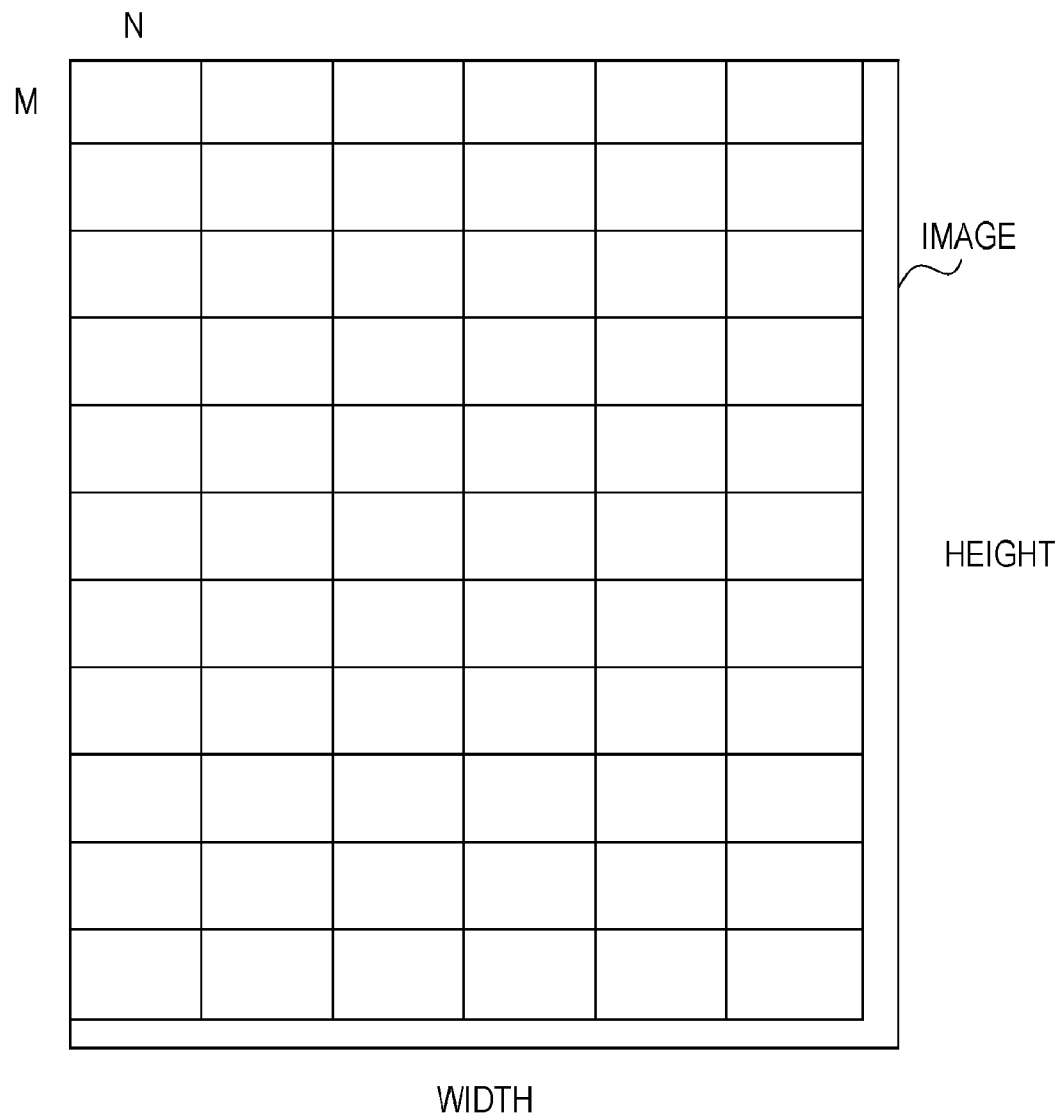
FIG. 6 shows example block structuralization performed by a block-structuralization unit.

A code-multiplexed area will be described based on FIG. 6. FIG. 6 shows a single image including horizontal pixels and vertical pixels, where the number of the horizontal pixels is determined to be WIDTH, and the number of the vertical pixels is determined to be HEIGHT. Here, the assumption is made that additional information is multiplexed on the single image. The upper-left point of the image is determined to be an origin point and the image is divided into blocks, where each of the blocks includes N horizontal pixels and M vertical pixels. According to the above-described embodiment, the block structuralization is performed on the precondition that the origin point is determined to be a reference point. However, a point provided at a predetermined distance from the origin point may be determined to be the reference point. For multiplexing the maximum amount of information on the image, blocks including N×M pixels are arranged from the reference point. When the number of blocks that can be arranged in the horizontal direction is determined to be W and the number of blocks that can be arranged in the vertical direction is determined to be H, the following relationships are established, as shown by the following equations:

$$W = INT(WIDTH/N) \qquad \text{Equation 1, and}$$

$$H = INT(HEIGHT/M) \qquad \text{Equation 2,}$$

where INT( ) indicates an integer part shown in ( ).

If the number of pixels is not divisible in each of Equations 1 and 2, and residual pixels exist, the residual pixels corresponds to the end part which appears when the plural blocks including the N×M pixels are arranged. That is to say, the residual pixels are not in the code-multiplexed area.

Figure 5:
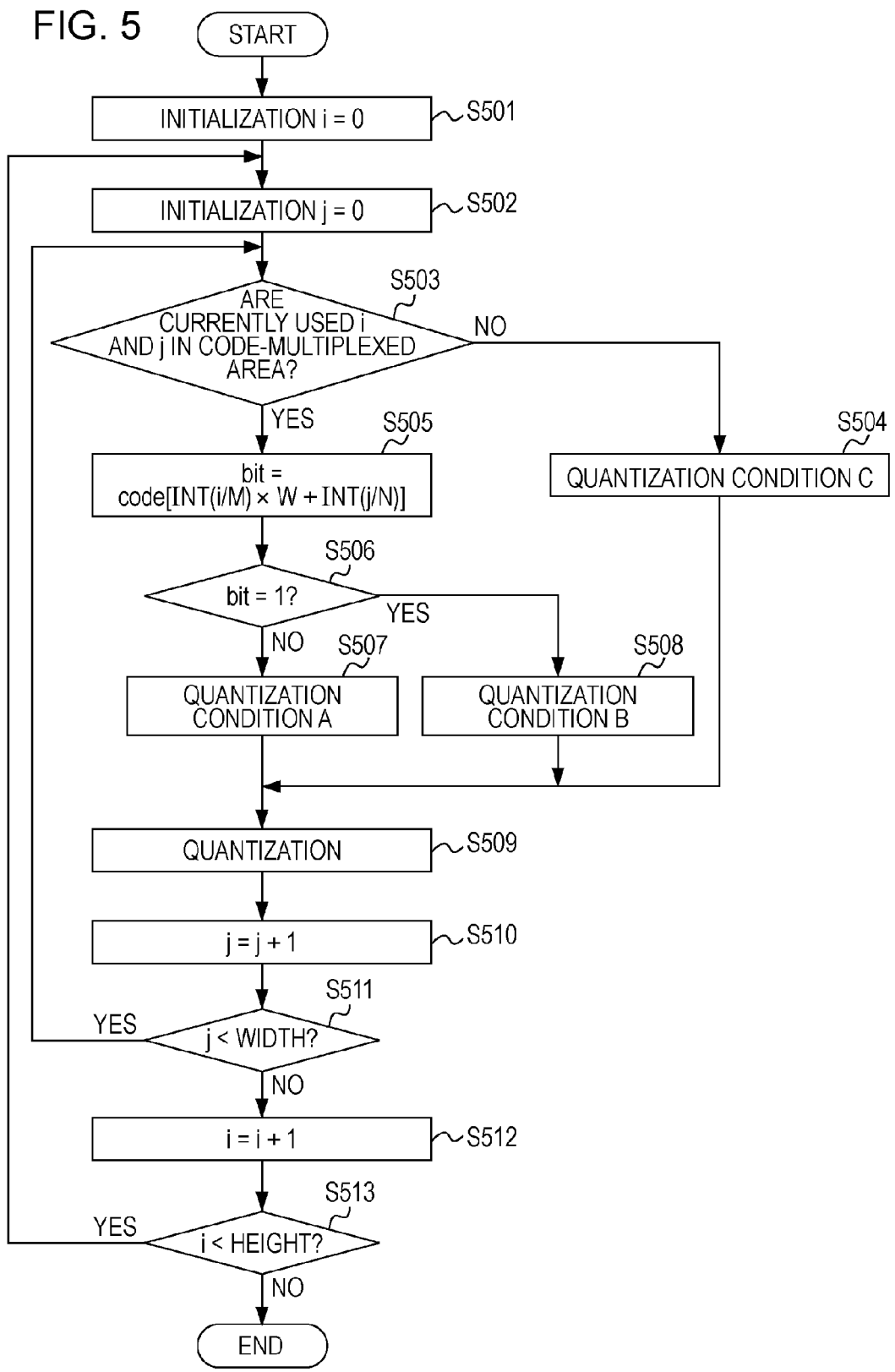
FIG. 5 is a flowchart showing multiplexing operations performed by a quantization-condition-control unit.

If it is determined that the currently processed target pixel is not in the code-multiplexed area, at step S503 shown in FIG. 5, a quantization condition C is set, at step S504. On the other hand, if it is determined that the currently processed target pixel is in the code-multiplexed area, additional information for multiplexing is read.

Here, the assumption is made that every single bit of the additional information is expressed by using a code-[ ] array for the sake of simplicity. If the additional information is 48-bit information, every single bit of the 48-bit information is stored in code [ ] of the array so that code [0], code [1], code [2], . . . , and code [47] exist. At step S505, variable bit substitutes information shown in the code [ ] of the array, as below.

$$bit = code[INT(i/M) \times W + INT(j/N)] \qquad \text{Equation 3}$$

next, it is determined whether or not the variable bit substituted at step S506 is 1. As described above, the information shown in the code [ ] of the array is stored in single bits. Therefore, the value of the variable bit indicates either 0 or 1. If it is determined that the value of the variable bit is 0 at step S506, quantization condition A is set at step S507. If it is determined that the value of the variable bit is 1 at step S506, quantization condition B is set at step S508.

Next, quantization is performed based on the set quantization condition at step S509. The above-described quantization corresponds to the error-diffusion method described in FIG. 3.

Next, the horizontal-direction variable j is counted up at step S510, and it is determined whether or not the horizontal-direction variable j is less than the number WIDTH of the horizontal pixels of the image at step S511. Then, the above-described processing is performed repeatedly until the number of processed pixels attains the number WIDTH. Further, when the horizontal-direction processing is performed by as much as the pixel number WIDTH, the vertical-direction variable i is counted up at step S512, and it is determined whether or not the vertical-direction variable i is less than the number HEIGHT of the vertical pixels of the image at step S513. Then, the above-described processing is performed repeatedly until the number of processed pixels attains the number HEIGHT.

By performing the above-described operations, the quantization condition can be changed in blocks including N×M pixels.

Next, examples of the quantization conditions A, B, and C will be described. Although the quantization conditions used for the error-diffusion method includes various factors, the quantization conditions of the above-described embodiment are determined to be the quantization-threshold values. As described above, when the quantization condition C is used for a block which does not belong to the code-multiplexed area, any quantization-threshold value can be used. When the gradation is expressed where a single pixel has 8-bit color information and the quantization level is binary, each of the maximum value 255 and the minimum value 0 becomes the quantization-representative value. Further, the value 128 existing midway between the quantization representative values 0 and 255 is often determined to be the quantization-threshold value. That is to say, under the quantization condition C, the quantization-threshold value is fixed to 128.

Since each of the quantization conditions A and B is used for a block existing in the code-multiplexed area, the image quality should be changed according to the difference between the quantization conditions. However, the change in the image quality should be expressed so that it is difficult for a user to visually perceive the change in the image quality even though the change in the image quality should be easily identified on paper.

Figure 7A:
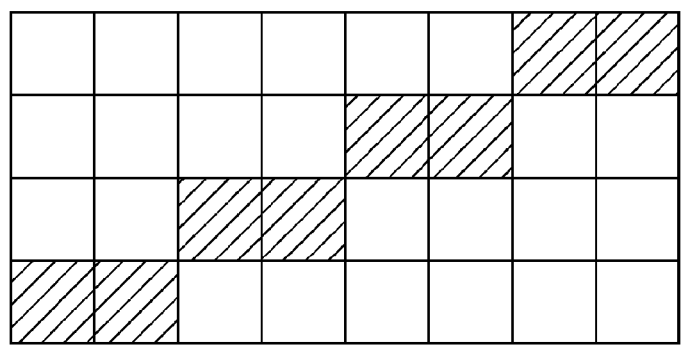
FIG. 7A shows an example change in a quantization-threshold value used by the quantization-condition-control unit under the first quantization condition.
Figure 7B:
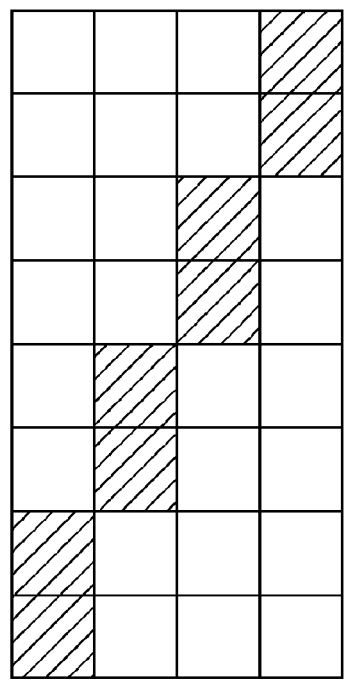
FIG. 7B shows an example change in a quantization-threshold value used by the quantization-condition-control unit under the second quantization condition.

FIG. 7A describes the example of the quantization condition A, and FIG. 7B describes the example of the quantization condition B. FIG. 7A shows the periodicity of variations in the quantization-threshold value when the quantization condition A is used. In FIG. 7A, the assumption is made that a single box corresponds to a single pixel, and a white box indicates a fixed threshold value and a gray box indicates a varying threshold value. That is to say, according to FIG. 7A, an 8-horizontal-by 4-vertical-pixel matrix is provided. Further, only for gray boxes, an outstanding value is determined to be a threshold value.

Likewise, FIG. 7B shows the periodicity of variations in the quantization-threshold value when the quantization condition B is used. In contrast with the case shown in FIG. 7A, the example shown in FIG. 7B indicates that a 4-horizontal-by 8-vertical-pixel matrix is provided. Then, only for gray boxes, an outstanding value is determined to be a threshold value.

When the gradation is expressed where a single pixel has 8-bit color information, as described above, the fixed-threshold value is determined to be 128 and the outstanding threshold value is determined to be 10, for example. When the quantization-threshold value is decreased, the quantization value of the target pixel tends to become 1 (the quantization-representative value 255). That is to say, in either of FIGS. 7A and 7B, the quantization value 1 is often shown in the gray-box array. That is to say, in each of the N×M-pixel blocks, a block where dots occur in the gray-box array shown in FIG. 7A and a block where dots occur in the gray-box array shown in FIG. 7B are mixed with each other. When the quantization value is not binary but ternary, each of the values 255, 128, and 0 becomes the quantization-representative value. Further, the values 64 and 192 are often determined to be the quantization-threshold values, where the quantization threshold value 64 is the value existing midway between the quantization representative values 0 and 128, and the quantization threshold value 192 is the value existing midway between the quantization representative values 128 and 255. That is to say, the quantization-threshold value is fixed to 64 and 192 under the quantization condition C.

Under the quantization conditions A and B, the outstanding threshold values of the pixels corresponding to the varying threshold values indicated by the gray parts shown in FIGS. 7A and 7B are determined to be 8 and 136. That is to say, quantization-representative values higher than those used when the fixed-threshold value is used tend to be arranged in the gray-box array. According to the above-described embodiment, the first multiplexing unit performs multilevel-error-diffusion processing by using a quaternary quantization value.

A slight change in the quantization-threshold value used for performing the error-diffusion method does not significantly affect the image quality. According to the organized dithering method, the quality of the gradation expression significantly changes according to the currently-used dither pattern. However, according to the above-described error-diffusion method where the quantization-threshold value is regularly changed, the gradation expression determining the image quality depends only on details on the error-diffusion method. Therefore, even though the arrangement of dots is slightly changed and the occurrence of a texture changes, for example, the quality of the gradation expression is hardly affected. This is because an error which is the difference between the signal value and the quantization value is diffused over surrounding pixels even though the quantization-threshold value is changed. Consequently, data on the value of a transmitted signal is macroscopically stored. That is to say, as for the dot arrangement and the texture occurrence, significantly high redundancy occurs.

Next, the second multiplexing unit 206 will be described with reference to FIG. 8.

Figure 10:
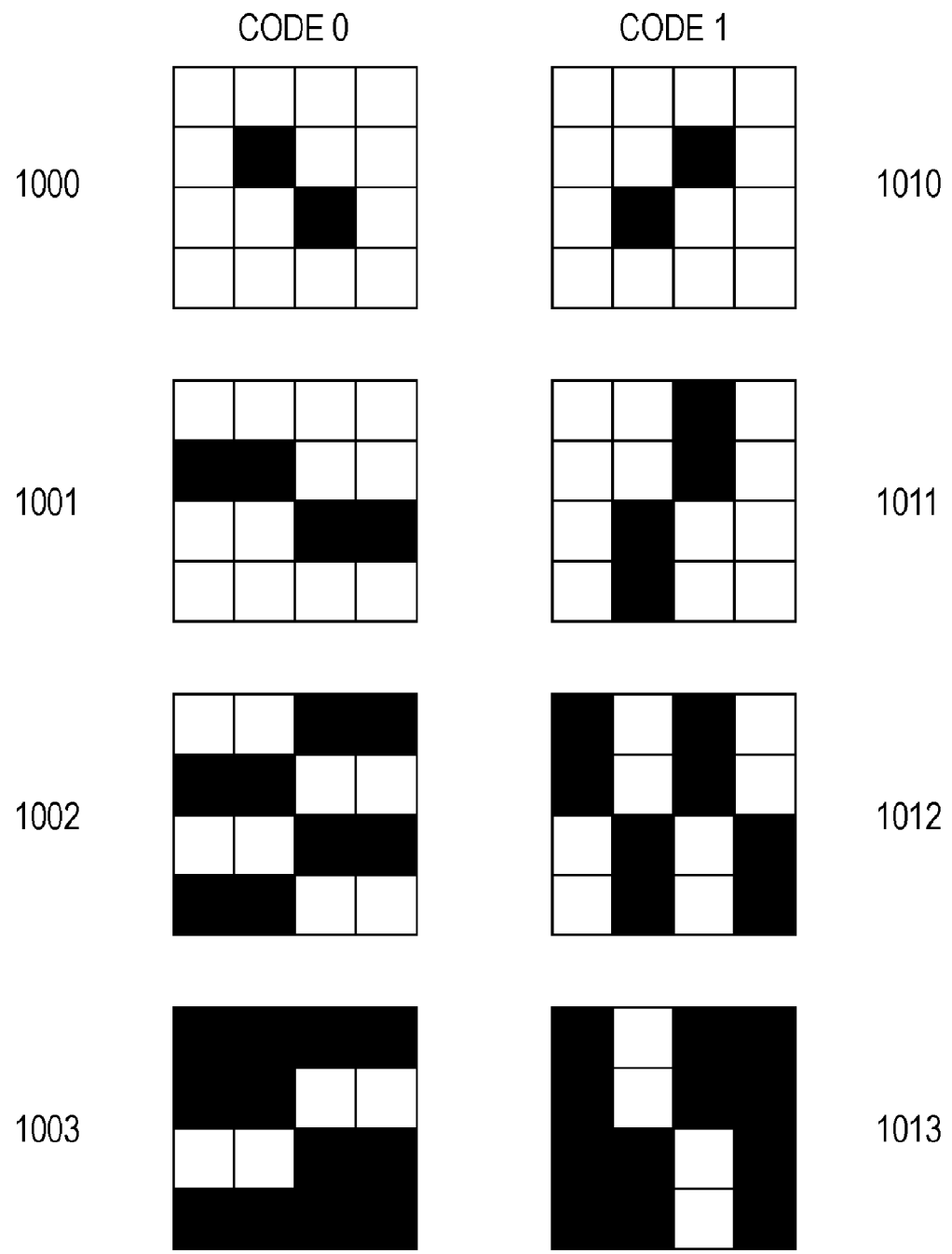
FIG. 10 shows an example pattern table.

A pattern-setting unit 801 is configured to input pattern information from a pattern table 802 and determines a dot pattern based on a value quantized by the first multiplexing unit 205 and additional information transmitted to the pattern-setting unit 801. According to the above-described embodiment, the first multiplexing unit 205 determines four types of quantization values 0, 1, 2, and 3 for each pixel, and the quantization values are transmitted to the pattern-setting unit 801. FIG. 10 shows example pattern tables. More specifically, two types of pattern tables are provided for the additional information corresponding to a single bit.

In FIG. 10, when code 0 is used, tables 1000, 1001, 1002, and 1003 are selected, and when code 1 is used, tables 1010, 1011, 1012, and 1013 are selected. The tables are selected according to the quantization values. Namely, when the quantization value 0 is used, the table 1000 and/or the table 1010 is selected. When the quantization value 1 is used, the table 1001 and/or the table 1011 is selected. When the quantization value 2 is used, the table 1002 and/or the table 1012 is selected. When the quantization value 3 is used, the table 1003 and/or the table 1013 is selected.

An inkjet printer according to the above-described embodiment quantizes the multilevel-error-diffusion processing with 600-dpi (dot per inch) resolution. Then, the inkjet printer further divides 600-dpi quantization information into 4×4 pixels, generates 2400-dpi binary information (the second quantization level), and expresses image information through turning on/off of the dots. Inherently, 17-level gradation can be expressed by dividing the quantization information into 4×4 pixels. However, only 4-level gradation is expressed considering an increase in the area rate of the dots and/or the spread of an ink on paper, and to perform the multiplexing function as well.

The additional-information-amount-control unit 204 adaptively divides the code amount into a code amount that should be multiplexed in the first multiplexing unit 205 and a code amount that should be multiplexed in the second multiplexing unit 206 by comparing the amount of the additional information and a predetermined threshold value. According to the above-described embodiment, even though the first multiplexing unit 205 has high robustness, the first multiplexing unit 205 multiplexes the code amount in a low-frequency band. Further, even though the second multiplexing unit 206 has low robustness, the first multiplexing unit 205 multiplexes the code amount in a high-frequency band where the image quality hardly decreases.

According to the above-described embodiment, the following control is performed according to the relationship between a predetermined code amount and the amount of the additional information.

When the additional-information amount is equivalent to or less than the predetermined code amount (equivalent to or less than a predetermined threshold value), the multiplexing is performed only by the first multiplexing unit and unification is achieved so that the second multiplexing unit uses fixed code (the code 0 and/or the code 1).

When the additional-information amount exceeds the predetermined code amount, the first multiplexing unit performs the multiplexing until the predetermined code amount is achieved, and an amount of code exceeding the predetermined code amount is multiplexed through the second multiplexing unit.

That is to say, under the above-described rules, a high priority is given to the first multiplexing so that an excess code amount that can be hardly handled by the first multiplexing unit 205 is multiplexed by the second multiplexing unit 206. Naturally, information indicating an estimation of the additional-information amount should be multiplexed as well as header information of the additional information at the time where the additional information is multiplexed.

In ordinary inkjet printers, there are often significant differences between the resolution of input digital data and that of the digital data output on paper. At the input time, the resolution of the digital data is usually about 600 dpi and/or 1200 dpi. However, at the output time, the resolution of the digital data is usually 4800 dpi and/or 9600 dpi. There are several methods of transforming multilevel image data of 600 dpi into binary data of 4800 dpi. First, there is a method of transforming the multilevel image data of 600 dpi into multilevel data of 4800 dpi through interpolation calculation and subjecting the transformed multilevel data to the pseudo-halftone processing. However, since a large amount of calculations is required, the above-described method is not efficient from the viewpoint of processing load due to an increase in the memory amount or the like.

Next, there is a method of performing the pseudo-halftone processing, so as to directly change multilevel data of 600 dpi to binary data of 4800 dpi. Usually, a density-pattern method is used when enlargement processing is performed during the pseudo-halftone processing. However, when the density-pattern method is performed, the sense of resolution decreases and the image quality hardly increases. According to the most appropriate method in terms of the image quality and the processing load, multilevel data of 600 dpi is decreased to a quantization value of several-level gradation of 600 dpi by using the multilevel-error-diffusion method and the several-level-gradation quantization value is changed into binary data of 4800 dpi by using the density-pattern method.

That is to say, the present invention uses the redundancy to perform the multiplexing, where the redundancy occurs while the pseudo half-tone processing is performed at least two times. Further, since the frequency bands of generated pixels are different from each other due to the pseudo half-tone processing performed at least two times, it is easy to make the frequency bands where the additional information is multiplexed different from each other.

According to the first pseudo-halftone processing, information is multiplexed in a frequency band lower than that of 600 dpi. Further, according to the second pseudo-halftone processing, information can be multiplexed in a frequency band higher than that of 600 dpi. Further, since the error-diffusion method is used for the first pseudo-halftone processing and the density-pattern method is used for the second pseudo-halftone processing, the multiplexing of the information can be achieved separately in the low frequency band and the high frequency band by using a simple configuration.

According to related technologies, it is difficult to multiplex information in the low frequency band and the high frequency band by performing transformation a single time during the step where a value n is quantized into a value m (n>m) through the pseudo-halftone processing. However, if the pseudo-halftone processing is performed in the following manner, the information can be multiplexed in the high frequency band. That is to say, according to the above-described pseudo-halftone processing, the quantization step is divided into plural steps so that the multiplexing is performed at each of the time where the transformation is performed for the first quantization (from the value n to a value p) and the time where the transformation is performed for the second quantization (from the value p to the value m), and the information is divided into data items of high resolutions at the second-quantization time.

Figure 9:
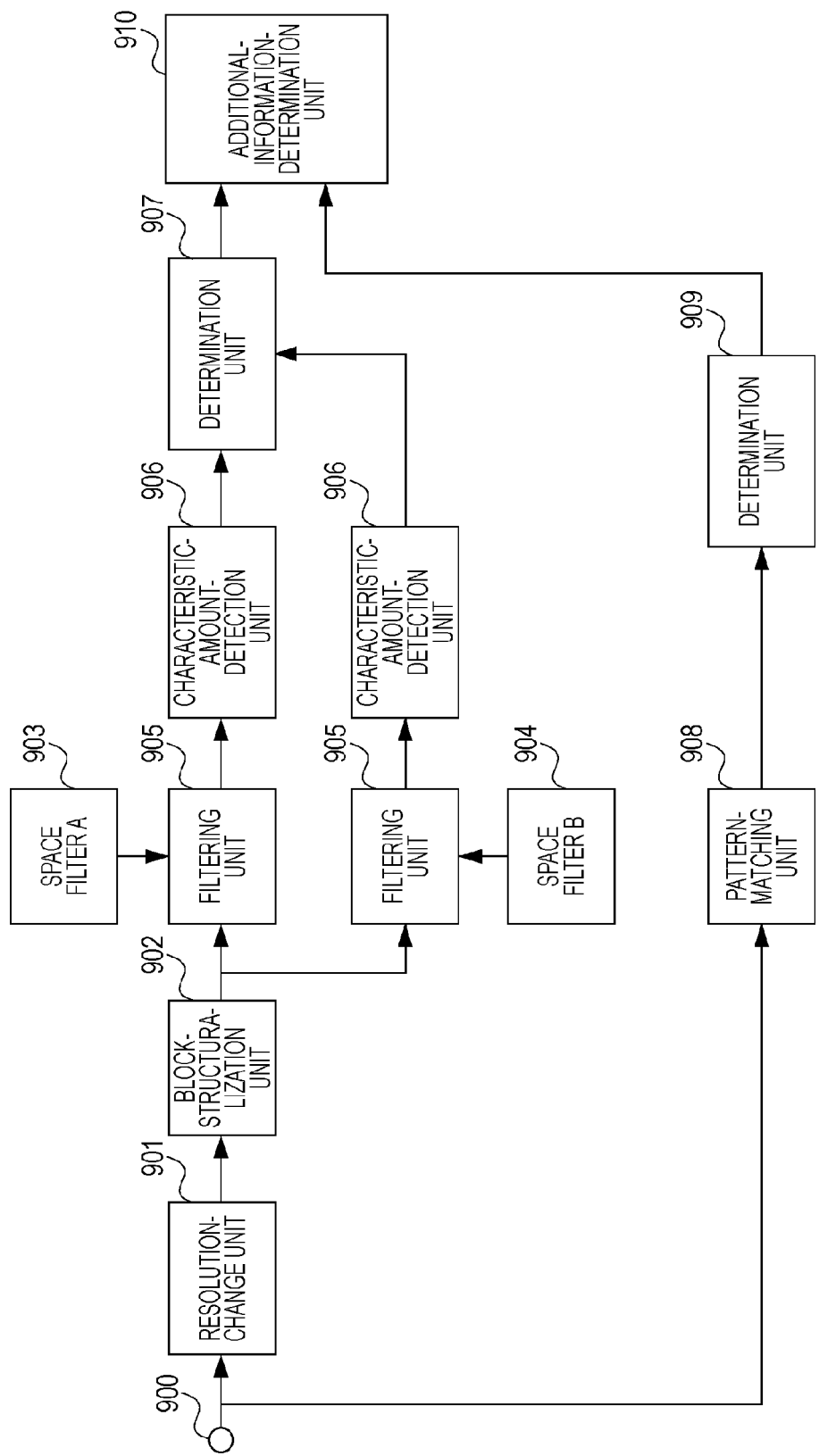
FIG. 9 is a main-block diagram showing an additional-information-separation device.

Next, an additional-information-separation device 106 will be described. FIG. 9 is a block diagram showing the configuration of the additional-information-separation device 106. Image information shown on a multiplexed printed matter is optically read by a scanner and transmitted to an input end 900. The resolution adopted by the above-described scanner should be at least two times higher than that adopted by a printer according to the sampling theorem. According to the above-described embodiment, scanning is performed in a resolution of 4800 dpi.

A resolution-change unit 901 is configured to reduce input information scanned at the resolution of 4800 dpi into information with a resolution of 600 dpi. Although the above-described reduction can be achieved through various known methods, linear interpolation is performed according to a second embodiment of the present invention.

A block-structuralization unit 902 is configured to achieve data separation and performs block structuralization so that the reduced and scanned information is divided into blocks including P×Q pixels.

Figure 11:
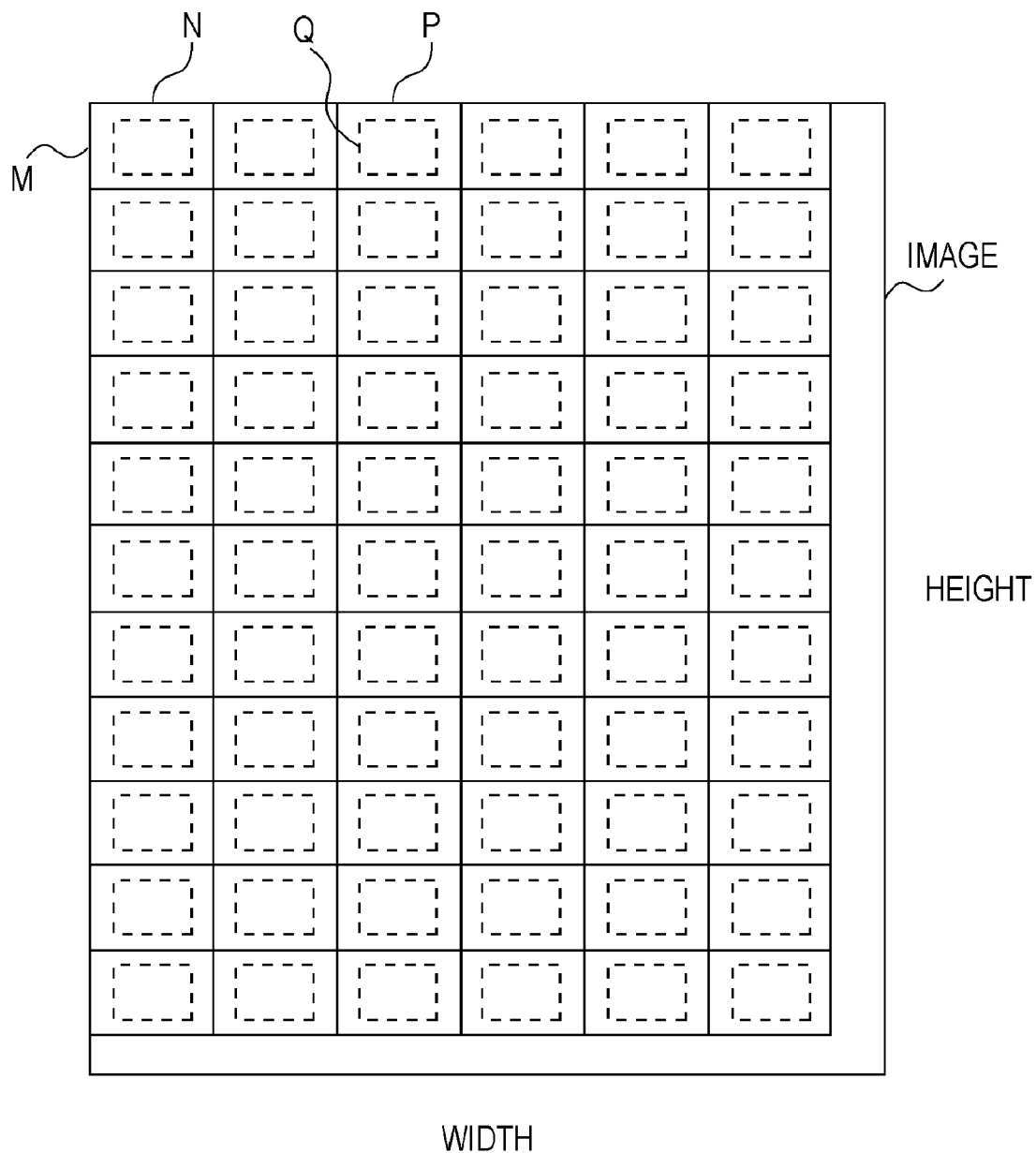
FIG. 11 shows example block structuralization performed by another block-structuralization unit.

FIG. 11 shows an example where the reduced and scanned information is divided into blocks including N×M pixels and blocks including P×Q pixels. Each of rectangular regions surrounded by solid lines is the block including N×M pixels. Further, each of rectangular regions that are shown in the blocks including N×M pixels and that are surrounded by dotted lines is the block including P×Q pixels.

The block including N×M pixels is obtained at the multiplexing time. The block including P×Q pixels needs to be smaller than the block including N×M pixels. That is to say, relationships are established, as below.

$$P \leq N, \text{ and } Q \leq M \qquad \text{Equations 4}$$

As shown in FIG. 11, the blocks including P×Q pixels are generated at regular intervals of pixels that should be skipped. That is to say, control is performed to determine the position where each of the blocks starts so that a single block including P×Q pixels is generated inside a region assumed to be a block which is generated at the multiplexing time and which is provided with N×M pixels. The number of pixels which should be skipped is determined based on the number of N horizontal pixels and that of M vertical pixels.

Figures 12, 13A, 13B:
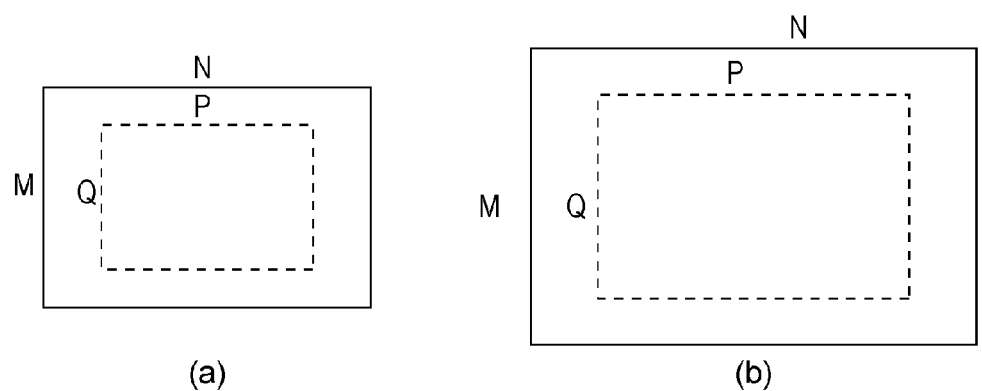
FIG. 12 shows the size relationship between blocks obtained through the block structuralization.
FIG. 13A shows an example space filter.
FIG. 13B shows another example space filter.

FIG. 12 shows the size relationship between the block including N×M pixels and the block including P×Q pixels. Since each of the value N and the value M changes according to a condition set at the multiplexing time, it is determined that each of the value P and the value Q increases with an increase in each of the value N and the value M (see parts (a) and (b) of FIG. 12).

Here, the values P and Q should be determined in advance such that the values P and Q are related to estimated values N and M. For example, each of the values P and Q can be obtained by subtracting a predetermined fixed value from each of the values N and M.

Characteristics of space filters A and B designated by reference numerals 903 and 904 are different from each other. A digital-filtering unit 905 is configured to calculate a sum of products of the target pixel and the surrounding pixels. Each of coefficients of the space filters A and B is generated according to the periodicity of a varying threshold value of the quantization condition used at the multiplexing time. Here, the quantization condition adopted in the multiplexing device is changed so that the additional information is multiplexed by using two types of periodicities shown in FIGS. 7A and 7B. FIGS. 13A and 13B show examples of the space filter A designated by reference number 903 and the space filter B designated by reference number 904 that are used in a separation device used at the multiplexing time.

In each of FIGS. 13A and 13B, the center part of the 5×5 pixels becomes the target pixel and the other 24 pixels become surrounding pixels. In each of FIGS. 13A and 13B, each of pixels provided in a blank part indicates that the value of a filtering coefficient is 0. As clearly shown in FIGS. 13A and 13B, each of the space filters A and B is an edge-enhanced filter. Further, the orientation of the enhanced edge agrees with the orientation of the varying threshold value obtained at the multiplexing time. That is to say, FIG. 13A agrees with FIG. 7A and FIG. 13B agrees with FIG. 7B.

A characteristic-amount-detection unit 906 is configured to detect the amount of some characteristics based on converted value obtained after filtering performed by the digital-filtering unit 905 through the space filter A 903 and/or the space filter B 904. Examples of the detected characteristic amount are shown below.

the maximum value of the converted values obtained in a block subjected to digital filtering the difference between the maximum value and the minimum value of the converted values obtained in the block subjected to the digital filtering variances of converted values obtained in the block subjected to the digital filtering According to the above-described embodiment, the above-described variances are determined to be the characteristic amount. A determination unit 907 compares the variances and determines a variance larger than the other to be code. Namely, when the variance obtained by the filtering performed through the space filter A is larger than the other, the determination unit 907 estimates that the quantization is achieved under the quantization condition A at the printing time. On the other hand, when the variance obtained by the filtering performed through the space filter B is larger than the other, the determination unit 907 estimates that the quantization is achieved under the quantization condition B at the printing time.

The quantization condition is synchronized with the code of additional information (bit shown in Equation 3). Therefore, if the quantization condition can be identified, multiplexed code can be determined. That is to say, if it is estimated that the quantization is achieved under the quantization condition A, the equation bit=0 holds. On the other hand, if it is estimated that the quantization is achieved under the quantization condition B, the equation bit=1 holds.

On the other hand, the scanned information transmitted through the input end 900 is transmitted to a pattern-matching unit 908. Then, the mask patterns corresponding to the code 0 and the code 1 are fitted to the scanned information in its original state as information with the resolution of 4800 dpi and the degree of fitting is detected. Since the pattern-matching method itself is known, the description thereof is omitted. Information about the degree of fitting of each of the code 0 and the code 1 is transmitted to a determination unit 909 which determines what code is used to achieve multiplexing.

An additional-information-determination unit 910 generates the entire multiplexed additional information based on the result of determination performed by each of the determination units A and B so that decoding of the multiplexed information is finished.

By performing above-described processing procedures, information multiplexed in plural frequency bands including a low frequency band and a high frequency band can be decoded from information printed on paper.

The above-described multiplexing method and the separation method constitute an embodiment of the present invention. However, the present invention is not limited to the above-described embodiment. For example, a method of using orthogonal transformation may be considered, as the separation method.

Further, the quantization conditions A, B, and C, and classes A and B used to perform classification constitute an embodiment of the present invention. However, the present invention is not limited to the above-described embodiment. Other ordinality may be provided or outstanding quantization-threshold values may be arranged in any fashion. Further, for making a change in the quantization condition, the horizontal periodicity and the vertical periodicity may be changed by using a counter. Further, a quantization-threshold-value table for which predetermined ordinality is set may be prepared, so as to be able to switch to and use the above-described quantization-threshold-value table.

Further, according to the above-described embodiment, the code amount assigned to each of the first multiplexing unit 205 and the second multiplexing unit 206 is controlled according to the amount of the additional information. The details on the assignment may be changed according to the type (importance) of the additional information. Robustness is assured by performing the method of multiplexing information in the low-frequency band. Therefore, for additional information for which lossless compression is required (important), the code amount assigned to the first multiplexing unit increases. On the other hand, for additional information which can allow losses (that is, additional information which is less important than the additional information requiring the lossless compression), it is effective to perform control so that the code amount assigned to the second multiplexing unit increases, where information is multiplexed in the high-frequency band through the second multiplying unit.

Both the first and second multiplexing units are provided in the printer. However, it is also effective that the first multiplexing unit performs its processing in the host computer, image information subjected to the multilevel-error-diffusion processing is transmitted to the printer side, and the second multiplexing including the density-pattern method is performed in the printer. In that case, the additional information should be retained in the printer. For example, for multiplexing information about the model number or the like of the printer, information about the model number or the like may be shared by the printer and the host computer. Further, for multiplexing different additional information for each of images, the different additional information should be transmitted to the printer side before transmitting image information.

Further, according to the above-described embodiment, the code amount assigned to each of the first multiplexing unit 205 and the second multiplexing unit 206 is controlled according to the amount of the additional information. However, details on the assignment may be changed according to the type of the image information. For an image of which deterioration is visually detected with ease, a method of increasing the code amount assigned to the second multiplexing unit may be used. Further, for an image which should be robust due to its many edges or the like, a method of increasing the code amount assigned to the first multiplexing unit may be used. Further, the code amount assigned to each of the first multiplexing unit 205 and the second multiplexing unit 206 may be dynamically changed according to the local characteristic of an image, or the local hue and an ink used for the image. For example, since information multiplexed in the low-frequency band is visually conspicuous in an achromatic color region, a higher priority may be given to multiplexing information in the high-frequency band for the achromatic color region.

Further, the code amount assigned to each of the first multiplexing unit 205 and the second multiplexing unit 206 may be changed according to the type of paper used for the printer and/or print-process mode (print-process condition) used at the time of printing information through the printer.

Further, it is also effective that the same code as that multiplexed during the first multiplexing is multiplexed during the second multiplexing on the same region defined on paper. The above-described configuration is effective in the circumstance where high robustness is needed.

Further, according to the above-described embodiment, the multiplexing unit is provided for each of the pseudo-halftone processing procedures. Although two steps of pseudo-halftone processing are performed in the above-described embodiments, three or more steps of pseudo-halftone processing may be performed.

Thus, according to the above-described embodiments, the additional information can be separated and multiplexed in the low frequency band and the high frequency band through a simple configuration. Consequently, the amount of the additional information can be increased by decreasing deterioration of the image quality and assuring the robustness.

Other Embodiments

It is to be understood that the object of the present invention can also be achieved by supplying program code achieving the functions of the above-described embodiments to a system and/or an apparatus directly and/or remotely so that the system and/or the apparatus reads and executes the supplied program code. Therefore, the program code itself installed in a computer, so as to achieve the functions of the above-described embodiments by the computer, is included in the technical scope of the present invention.

In that case, the program code may be, for example, object code, a program executed by an interpreter, script data or the like supplied to an operating system (OS), etc., so long as the program code functions as a program.

A recording medium supplying a computer program may be, for example, a floppy disk, a hard disk, an optical disk including a compact disk (CD) and a digital-versatile disk (DVD), a magneto-optical disk, a magnetic tape, a nonvolatile memory card, a read-only memory (ROM), etc.

Further, not only by the computer reading and executing the program, but also by the computer executing part of or the entire actual process utilizing an OS or the like running on the computer based on instructions of the program code, the functions of the above-described embodiments may be achieved.

Further, the program read from the recording medium is written into a memory of a function-expansion board inserted into the computer and/or a function-expansion unit connected to the computer. Then, a central-processing unit (CPU) or the like of the function-expansion board and/or the function-expansion unit executes part of and/or the entire actual processing based on instructions of the program, so that the functions of the above-described embodiments are achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-123411 filed on May 8, 2007, which is hereby incorporated by reference herein in its entirety.

What is claimed is:

1. An image-processing apparatus multiplexing additional information on image information, the image-processing apparatus comprising:

a first multiplexing unit that is configured to perform pseudo-halftone processing at a pseudo-halftone-processing time so that the image information is changed into a first quantization level of multi-level gradation and that is configured to multiplex first information of the additional information at the pseudo-halftone-processing time; and a second multiplexing unit that is configured to perform the pseudo-halftone processing so that the first quantization level subjected to the pseudo-halftone processing by the first multiplexing unit is changed into a second quantization level of gradation lower than the multi-level gradation and that is configured to multiplex second information of the additional information at the pseudo-halftone-processing time, wherein a frequency band where the first information is multiplexed by the first multiplexing unit is different from a frequency band where the second information is multiplexed by the second multiplexing unit, wherein the first multiplexing unit multiplexes the first information in a band of frequencies lower than a frequency used for the pseudo-halftone processing performed by the first multiplexing unit, and multiplexes the first information in a band of frequencies higher than a frequency used for the pseudo-halftone processing performed by the second multiplexing unit.

2. The image-processing apparatus according to claim 1, further comprising an additional-information-amount-control unit configured to control assignment of each of the first information multiplexed by the first multiplexing unit and the second information multiplexed by the second multiplexing unit.

3. The image-processing apparatus according to claim 2, wherein the additional-information-amount-control unit controls the assignment based on an amount of the additional information.

4. The image-processing apparatus according to claim 2, wherein the additional-information-amount-control unit controls the assignment based on importance of the image information.

5. The image-processing apparatus according to claim 2, wherein the additional-information-amount-control unit controls the assignment based on a local characteristic of the image information.

6. The image-processing apparatus according to claim 2, wherein the additional-information-amount-control unit controls the assignment based on a type of an ink used at a time where printing is performed through a printer.

7. The image-processing apparatus according to claim 2, wherein the additional-information-amount-control unit controls the assignment based on a print-process condition adopted at a time where printing is performed through a printer.

8. The image-processing apparatus according to claim 2, wherein when an amount of the additional information is equivalent to a predetermined threshold value or less, the additional-information-amount-control unit assigns the entire additional information to be multiplexed by the first multiplexing unit.

9. The image-processing apparatus according to claim 1, wherein processing performed by the first multiplexing unit is performed in a computer and processing performed by the second multiplexing unit is performed in a printer.

10. The image-processing apparatus according to claim 1, wherein the first multiplexing unit multiplexes the first information by modulating a quantization-threshold value used for the pseudo-halftone processing performed by the first multiplexing unit and the second multiplexing unit multiplexes the second information based on code for multiplexing and a pattern determined based on a quantization level obtained through quantization achieved by the pseudo-halftone processing performed by the first multiplexing unit.

11. The image-processing apparatus according to claim 1, wherein the pseudo-halftone processing performed by the first multiplexing unit is an error-diffusion method and the pseudo-halftone processing performed by the second multiplexing unit is a density-pattern method.

12. A non-transitory computer-readable recording medium storing a computer program provided to control an image-processing apparatus and make the image-processing apparatus function as the units of the image-processing apparatus according to claim 1.

13. An image-processing method performed to multiplex additional information on image information, the image-processing method comprising:

performing pseudo-halftone processing at a pseudo-halftone-processing time so that the image information is changed into a first quantization level of multi-level gradation and first information of the additional information is multiplexed at the pseudo-halftone-processing time; and performing the pseudo-halftone processing so that the first quantization level subjected to the pseudo-halftone processing at the first multiplexing step is changed into a second quantization level of gradation lower than the multi-level gradation and where second information of the additional information is multiplexed at the pseudo-halftone-processing time, wherein a frequency band where the first information is multiplexed at the first multiplexing step is different from a frequency band where the second information is multiplexed at the second multiplexing step, wherein the first information is multiplexed in a band of frequencies lower than a frequency used for the pseudo-halftone processing performed at the first multiplexing step, and the first information is multiplexed in a band of frequencies higher than a frequency used for the pseudo-halftone processing performed at the second multiplexing step.

14. The image-processing method according to claim 13, further comprising controlling assignment of each of the first information multiplexed at the first multiplexing step and the second information multiplexed at the second multiplexing step.

15. The image-processing method according to claim 13, wherein processing performed at the first multiplexing step is performed in a computer and processing performed at the second multiplexing step is performed in a printer.

* * * * *